May 4, 1937.  J. D. ROSS  2,079,184
TIRE CHAIN
Filed Sept. 10, 1934   2 Sheets-Sheet 1
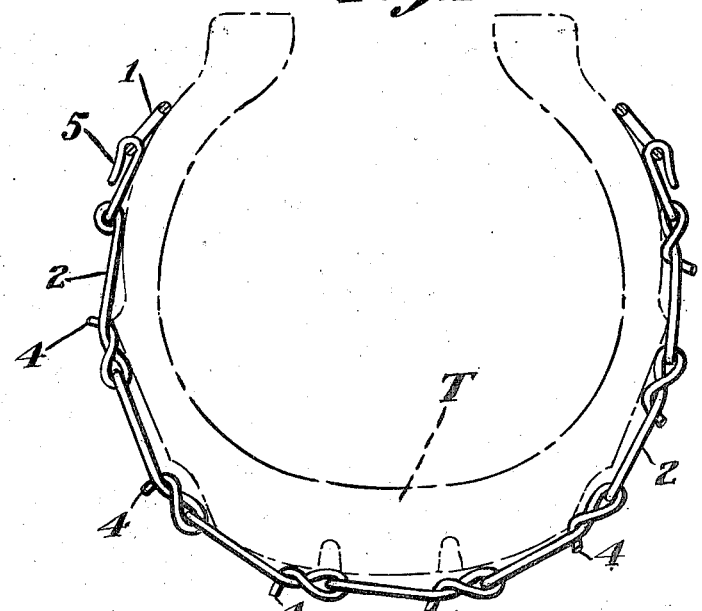
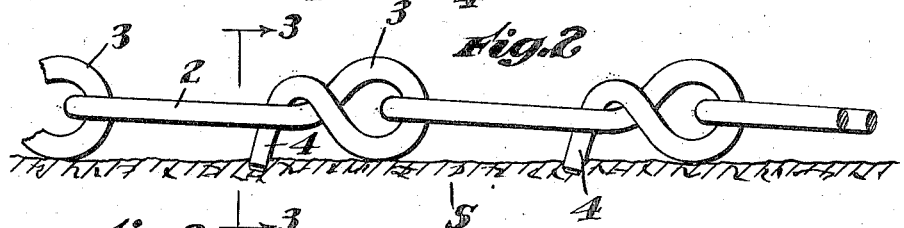
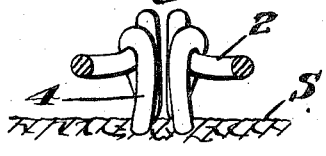
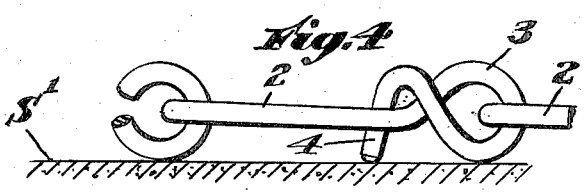
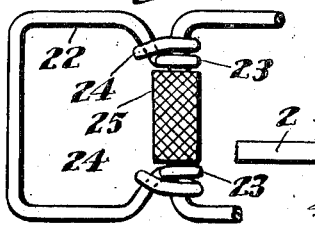
Inventor
John D. Ross
By Attorney May 4, 1937.   J. D. ROSS   2,079,184
TIRE CHAIN
Filed Sept. 10, 1934   2 Sheets-Sheet 2
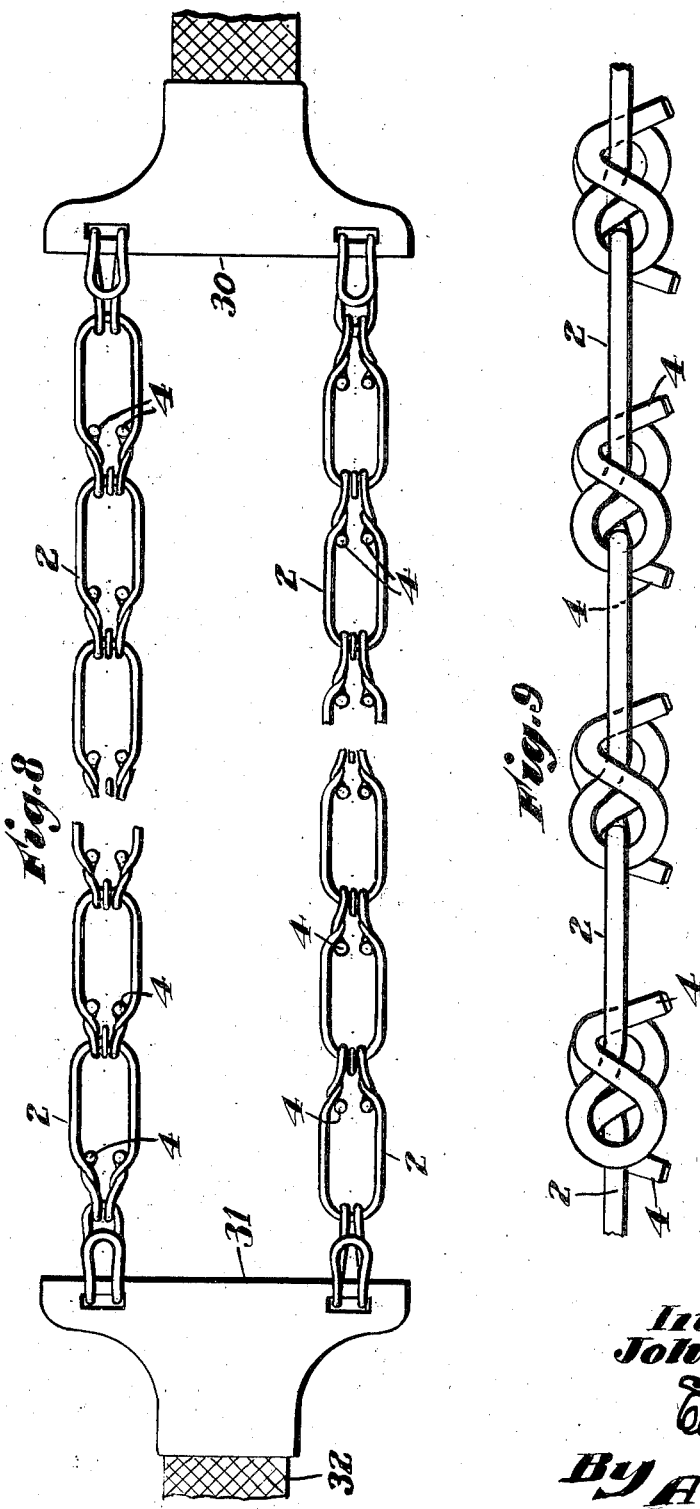
Inventor
John D. Ross
By Ellis Spear Jr.
Attorney Patented May 4, 1937

2,079,184

UNITED STATES PATENT OFFICE 2,079,184

TIRE CHAIN

John D. Ross, Brewer, Maine

Application September 10, 1934, Serial No. 743,385

4 Claims. (Cl. 152—14)

This invention relates to improvements in so-called non-skid or anti-skid chains for automobile tires and particularly to cross link members for such chains. With the rapid development of the automobile and in traffic in which both speed and congestion have been so greatly increased, the matter of tire chain improvement has become of increasing urgency.

The usual type of tire chain has proven its own importance and would have been supposed to suggest the line of its own improvement but there were certain difficulties inherent in this type and the problem has been further complicated by new and added difficulties. While, therefore, the ordinary tire chains in use afford a certain degree of safety they have not been found responsive, safely and consistently to the conditions imposed by ice or icy surfaces or on frozen or frosted streets or road surfaces.

The usual flat link tire chain has been an excellent tractive appliance but has not been able to meet the tendency of cars to skid laterally and the danger of side skids has made an insistent demand for some new safety factor.

My present invention provides for this while conforming to the usual habits and requirements of modern drivers. According to my invention this new lateral safety factor constitutes a new or additional tire chain improvement and one capable of being combined with the older features so that the advantage of past experience and equipment is not lost.

The invention is applicable to tire chains of any type or design, but I shall refer herein more particularly to the ladder type chain in which the tread chains or cross chains are sustained transversely of the tire by suitable side chains or connections.

As distinguished from the usual cross chain as previously known, in which an elliptical link was deliberatey twisted in order to flatten the bearing surface, the concept of my invention provides for linkage which has certain portions or parts made in deliberate departure from the plane of the shackle parts so as to provide spurs or projections on the road contacting side of the links, and while such portions are capable of being formed in a variety of ways, such links may generally be described as consisting of a shackle portion, the function of which is generally that of linkage, and a resilient hook or fluke portion the conspicuous function of which is of calk-like or slip-resisting character.

As illustrative of my invention I have shown in the accompanying drawings characteristic embodiments which I will describe and discuss in the specification which follows. Throughout the specification and drawings like reference characters are employed to indicate corresponding parts, and in the drawings:

Fig. 1 is an edge view of a strip of cross links in accordance with my invention in position on a tire or shoe indicated as in section by the broken lines.

Fig. 2 is an enlarged side view of links of such a member shown as laid out for illustrative purposes on a flat surface such as that of a road.

Fig. 3 is a fragmentary view of a link as indicated on a section 3—3, of Fig. 2, and viewed in the direction of the arrow.

Fig. 4 is a side view of a link as in Fig. 2, but with the spur or calk points flexed or sprung up.

Fig. 5 is a fragmentary view of a modified form of link.

Fig. 6 is an edge view of such a modified form.

Fig. 7 a further modification of the forms shown in Figs. 1 to 4, and

Figs. 8 and 9 show an adaptation of my invention for use as an emergency tire chain.

In the drawings I have indicated at T a section of a tire on which is shown a cross chain consisting of a plurality of links 2. The links 2 are joined to the side chains 1 by end hooks 5 having resilient lips adapted to be sprung over the loops of the side chains 1.

Each of the links 2 consists of a main shackle portion which assumes the function of connecting the separate links to each other, and a nodal portion 3 formed by the stock of the shackle portion which has been bent or twisted upon itself to form on the opposite face of the link spur ends 4. The spurs 4 are particularly efficacious in overcoming any sliding or slipping tendency of the tire or wheel sideways on the pavement or other surfaces.

The modification illustrated in Figs. 5 and 6 shows a different type of link 22 of more rectangular outline of its shackle portion. The sides of this portion are looped or bent around the transverse portion of the next adjacent link to form the eye portion 23 and are again bent as at 24 to form a spur or resilient calk. In this form the eye portions 23 and the spurs 24 are held spaced apart by a cylindrical block or roller 25 carried on the transverse portion of the link thus attached.

In the form shown in Fig. 7, the links are of the general structure first described in connection with Figs. 2, 3 and 4. In this form, however, a simple ring 6 is provided as a spacer for the loops 3 to prevent the spurs 4 from becoming wedged laterally or frictionally bound on the curve at the ends of the shackle part of the link.

By providing the wire or like stock of a proper resiliency the points of the spurs 4 may yield slightly against the tire surface as suggested in Fig. 4 in which the surface $S^1$ is indicated as not penetrated by the point of the spur 4. In Figs. 2 and 3, the surface S is shown as slightly penetrated by the points of the spurs 4. These points may be shorn off abruptly to give a flat end as shown or may be rounded or otherwise formed to give the desired contact.

Referring to Figs. 8 and 9 wherein I show an adaptation useful as an emergency tire chain, meaning thereby a tire chain of the type which is fastened between the spokes of the wheel, I have indicated at 30 and 31 a pair of end members and at 32 a connecting strap therebetween. These fit across the rim and may be equipped with any suitable quick detachable fastening. Either one or two cross chains may be employed. As here shown the members 30 and 31 carry a pair of cross chains consisting of the connected series of links 2, the arrangement being such that the spurs 4 in one chain or course of links are staggered with reference to those of the other chain or course of links. This insures a better traction and anti-skidding effect.

In the case of tire chains of the so-called ladder type in accordance with my invention, the cross chains are preferably alternately reversed to dispose the points 4 of successive cross chains, considered peripherally of the tire, in opposite angular relation to it laterally to resist side skids in either direction.

Other modifications in the forms and construction of my invention may be resorted to without departing from the spirit of my invention if within the limits of the appended claims.

What I therefore claim and desire to secure by Letters Patent is:—

1. A detachable cross chain for a tire chain, including a plurality of resilient wire cross links for the tread, each including a shackle part for engagement with the next adjacent link, and a loop part comprising a pair of spaced shackle loops, a spacer between said loops and surrounding the included shackle portion and adapted to limit the relative sliding movement of the links, the ends of said loop part being continued past the road face of the shackle loop and resiliently supported by the resilient loop part, and hooks on each end of the cross chain for detachably engaging the side links of a tire chain.

2. In an anti-skid tire chain, a pair of cross chains, means to support said chains transversely of the tread of the tire, each of said cross chains including a series of wire links, said links including a shackle part and a loop in engagement with the next adjacent link, the ends of said loops being extended as spurs beyond the road face of said shackle loop at a downward inclination, the disposition of said spurs being reversed in the members of adjacent pairs so as to point in opposite lateral directions when in place upon a tire.

3. An anti-skid tire chain comprising a plurality of connected links each formed from a single length of wire bent into substantially U-shape to provide a pair of spaced side portions and a cross portion at one end of the link connecting said side portions together, the terminal part of each side portion being bent to form at the other end of the link a spring eye, the pair of eyes of each link accommodating the cross portion of the next adjacent link, the under portions of said eyes being disposed below the plane of the side portions and constituting road engaging surfaces, the terminal part of each side portion continuing from its related eye upwardly across one side of the same side portion and thence downwardly across the other side of the same side portion and terminating in a downwardly directed road engaging spur the free end of which is disposed normally below the plane of the bottoms of the eyes, whereby said spurs are supported laterally by said shank portions and are free to move upwardly relatively thereto against the spring action of said eyes upon encountering an obstruction in the road and are returned to their normal road engaging positions by the spring action of said eyes after the obstruction has been passed.

4. In an anti-skid tire chain, a pair of cross chains each comprising a plurality of connected links each having at one end thereof a downwardly directed spur inclined toward the other end of the link, the spurs of the links of one of said cross chains being oppositely inclined with respect to the spurs of the links of other of said cross chains.

JOHN D. ROSS.